(12) United States Patent
Vollbracht et al.

(10) Patent No.: US 12,259,468 B2
(45) Date of Patent: Mar. 25, 2025

(54) RADAR SYSTEM

(71) Applicant: Aptiv Technologies AG, Schaffhausen (CH)

(72) Inventors: Dennis Vollbracht, Hilden (DE); Mathias Busch, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 325 days.

(21) Appl. No.: 17/817,926

(22) Filed: Aug. 5, 2022

(65) Prior Publication Data
US 2023/0039021 A1 Feb. 9, 2023

(30) Foreign Application Priority Data

Aug. 6, 2021 (EP) .................................... 21190108

(51) Int. Cl.
*G01S 13/931* (2020.01)
(52) U.S. Cl.
CPC .................................. *G01S 13/931* (2013.01)
(58) Field of Classification Search
None
See application file for complete search history.

(56) References Cited

U.S. PATENT DOCUMENTS

| 3,794,997 | A | | 2/1974 | Watsuki et al. | |
|---|---|---|---|---|---|
| 4,210,357 | A | | 7/1980 | Adachi | |
| 4,933,681 | A | | 6/1990 | Estang | |
| 5,714,947 | A | * | 2/1998 | Richardson | H01Q 1/3233 343/781 CA |
| 5,933,109 | A | * | 8/1999 | Tohya | H01Q 1/3233 342/175 |
| 2006/0092076 | A1 | | 5/2006 | Franson | |
| 2011/0012801 | A1 | * | 1/2011 | Monte | H01Q 19/19 343/781 CA |

(Continued)

FOREIGN PATENT DOCUMENTS

| DE | 4412769 | 10/1995 |
|---|---|---|
| DE | 10109371 | 11/2001 |

(Continued)

OTHER PUBLICATIONS

"Extended European Search Report", EP Application No. 21190108.7, May 3, 2022, 20 pages.

(Continued)

*Primary Examiner* — Whitney Moore
(74) *Attorney, Agent, or Firm* — Harness, Dickey & Pierce, P.L.C.

(57) ABSTRACT

Disclosed are aspects of a radar system for a vehicle that includes a first radar antenna assembly connected to at least one radar transmitter for transmitting radar signals into a traffic space and a second radar antenna assembly connected to at least one radar receiver for receiving radar signals reflected by objects present in the traffic space. The first radar antenna assembly is spaced apart from the second radar antenna assembly. The at least one radar transmitter is coupled to the at least one radar receiver by a synchronization line for a bistatic radar operation of the radar system. Further, at least one of the first radar antenna assembly or the second radar antenna assembly includes a feed horn and a reflector for the feed horn.

18 Claims, 3 Drawing Sheets

(56) References Cited

U.S. PATENT DOCUMENTS

| | | | | |
|---|---|---|---|---|
| 2011/0095953 | A1* | 4/2011 | Lier | ............... H01Q 19/17 343/755 |
| 2018/0210079 | A1* | 7/2018 | Hammerschmidt | .. G01S 13/931 |
| 2020/0271751 | A1* | 8/2020 | Mayer | ............... G01S 7/411 |
| 2021/0011144 | A1 | 1/2021 | Crosby | |
| 2021/0239791 | A1 | 8/2021 | Vollbracht et al. | |
| 2023/0037906 | A1 | 2/2023 | Bollbracht et al. | |
| 2023/0045388 | A1 | 2/2023 | Vollbracht et al. | |

FOREIGN PATENT DOCUMENTS

| | | |
|---|---|---|
| DE | 10060603 | 6/2002 |
| DE | 102016125190 | 6/2018 |
| DE | 102017223471 | 6/2019 |
| DE | 102019200127 | 7/2020 |
| EP | 0805360 | 11/1997 |
| EP | 0978729 | 2/2000 |
| JP | S5534541 | 3/1980 |
| JP | H11160426 | 6/1999 |
| JP | 2019009713 | 1/2019 |
| WO | 2013095223 | 6/2013 |

OTHER PUBLICATIONS

"Restriction Requirement", U.S. Appl. No. 17/817,909, filed Jul. 10, 2023, 9 pages.
"Extended European Search Report", EP Application No. 21190101.2, Jan. 18, 2022, 12 pages.
"Extended European Search Report", EP Application No. 21190090.7, Jan. 26, 2022, 10 pages.
"Partial European Search Report", EP Application No. 21190108.7, Feb. 3, 2022, 17 pages.

* cited by examiner

RADAR SYSTEM

INCORPORATION BY REFERENCE

This application claims priority to European Patent Application Number 21190108.7, filed Aug. 6, 2021, the disclosure of which is incorporated by reference in its entirety.

BACKGROUND

Radar systems installed on vehicles are increasingly used to monitor the traffic space and in particular to detect objects like other vehicles, pedestrians, or stationary obstacles present in the traffic space. Many advanced driver assistance systems (ADAS), such as lane departure warning systems, lane change assistance systems, and active brake assist systems, rely on input signals provided by radar systems. Vehicle radar systems are also important for autonomous driving (AD) applications. Objects in the environment of a vehicle may be identified by means of transmitting a primary radar signal into the traffic space, receiving a secondary radar signal reflected by at least one object, and processing the secondary radar signal.

Usually, automotive radar systems are provided as modules comprising an integrated radar circuit and a radar antenna assembly arranged on a common board. The antenna aperture and the antenna gain of such modules is limited. Further, due to the plurality of constructional elements which are necessary for such a module, the fabrication costs are comparatively high. In practice, a reliable detection of objects located at different distances to the radar system and of objects having adverse geometries is difficult.

Accordingly, there is a need to provide vehicle radar systems which are easy to produce, which have improved aperture and gain values, and which provide a reliable detection of objects even under adverse conditions.

SUMMARY

The present disclosure provides radar systems according to the independent claims. Example embodiments are given in the subclaims, the description, and the drawings. The present disclosure further relates to vehicle radar systems.

In one aspect, the present disclosure is directed at a radar system for a vehicle, with the radar system comprising a first radar antenna assembly configured to be connected to at least one radar transmitter for transmitting radar signals into a traffic space and a second radar antenna assembly configured to be connected to at least one radar receiver for receiving radar signals reflected by objects present in the traffic space. The first radar antenna assembly is spaced apart from the second radar antenna assembly. The at least one radar transmitter is coupled to the at least one radar receiver by a synchronization line for a bistatic radar operation of the radar system, and at least one of the first radar antenna assembly or the second radar antenna assembly comprises a feed horn and a reflector for the feed horn.

A spatial separation of transmitter and receiver enhances the detection capabilities of the radar system and enables the identification of small and hardly reflecting objects. It has turned out that a combination of a bistatic configuration with a reflector configuration provides a particularly high performance for a vehicle radar system.

Each of the first radar antenna assembly and the second radar antenna assembly may comprise a feed horn and a reflector for the feed horn. The feed horn may comprise a plurality of individual antenna elements and a plurality of waveguide members for respective connections of the antenna elements to the corresponding radar circuit. An advanced beam steering may thus be provided. The individual antenna elements may be output ends of the waveguides. The output ends may be shaped dependent on the requirements of the application. At least two of the individual antenna elements may be connected to separate transmitters of a radar circuit. Thus, several transmitter channels may be provided to enable a beam steering.

The radar system may further comprise one or more of the following features:

The radar system may comprise a metallic component of the vehicle, and the reflector may be formed by a curved or faceted surface portion of the metallic component of the vehicle. The metallic component may include a recess and an insert member insertable into the recess, wherein the insert member comprises the curved or faceted surface portion. The reflector may be elliptically shaped. The synchronization line may comprise a dielectric waveguide member. The radar system may comprise at least one radar circuit configured for an angle finding operation, in particular a phase-difference-based angle finding operation.

According to an embodiment, the radar system comprises a metallic component of the vehicle, and the reflector is formed by a curved or faceted surface portion of the metallic component of the vehicle. Thus, the metallic component of the vehicle may be at least partially used as an antenna reflector. By incorporating an already present structure of the vehicle into the antenna design, the material costs may be reduced. In particular, a separate reflector may be omitted. The metallic component of the vehicle may have a relatively large size and thus provide a large reflector surface. Therefore, the aperture and the gain of the radar antenna assembly may be considerably extended compared to radar building blocks. In a mounted state of the metallic component of the vehicle, the curved or faceted surface portion may face away from a center of the vehicle to enable a monitoring of the surrounding of the vehicle. The curved or faceted surface portion may be concave with respect to the feed horn.

According to another embodiment, the metallic component has a recess and an insert member insertable into the recess, wherein the insert member comprises the curved or faceted surface portion. A manufacturer of the radar system may easily prefabricate a module comprising the insert member and deliver the module to a manufacturer of the vehicle, who inserts the insert member into the recess of an existing crash beam or the like.

According to another embodiment, the reflector is elliptically shaped. The field of view, either in the azimuthal or in the elevational plane depending on the application, is thereby increased. In particular, a fan beam instead of a pencil beam may be provided by the elliptical reflector. The feed horn may be positioned in a focal region of the reflector.

According to another embodiment, the synchronization line comprises a dielectric waveguide member to allow for a dual chip mode. Alternatively or additionally, the synchronization line may comprise an air-filled metallic waveguide member. The first radar antenna assembly and the second radar antenna assembly may also have antennas facing each other at approximately 20 GHz.

According to another embodiment, the radar system comprises at least one radar circuit configured for, or configured to perform, an angle finding operation.

In another aspect, the present disclosure is directed at a radar system for a vehicle, in particular a radar system as disclosed above. The radar system comprises a first radar antenna assembly connected to at least one radar transmitter for transmitting radar signals into a traffic space, a second radar antenna assembly connected to at least one radar receiver for receiving radar signals reflected by objects present in the traffic space, and a metallic component of the vehicle. The first radar antenna assembly is spaced apart from the second radar antenna assembly. The at least one radar transmitter is coupled to the at least one radar receiver by a synchronization line for a bistatic radar operation of the radar system. Further, the synchronization line is configured as a waveguide member formed by the metallic component of the vehicle.

In particular, a metallic component in the form of a hollow profile may be used as a waveguide member. Usually, such metallic structures are already present in a motor vehicle and may be used as a component of a radar antenna assembly in order to decrease the fabrication costs. The metallic component may form at least a part of a crash beam of the vehicle.

In another aspect, the present disclosure is directed at a radar system for a vehicle, in particular a radar system as disclosed above. The radar system comprises a radar circuit configured to generate and process radar signals, a first radar antenna unit configured to transmit radar signals into a traffic space and to receive radar signals reflected by objects present in the traffic space, and a second radar antenna unit configured to transmit radar signals into a traffic space and to receive radar signals reflected by objects present in the traffic space. The first radar antenna unit and the second radar antenna unit have different antenna gains. The radar circuit is configured to provide a first radar channel based on a transmission of radar signals via the first radar antenna unit and on a reception of radar signals via the first radar antenna unit, a second radar channel based on a transmission of radar signals via the second radar antenna unit and on a reception of radar signals via the second radar antenna unit, and a third radar channel based on a transmission of radar signals via the first radar antenna unit and on a reception of radar signals via the second radar antenna unit. The third radar channel can alternatively or additionally be based on a transmission of radar signals via the second radar antenna unit and on a reception of radar signals via the first radar antenna unit.

Such a radar system provides a high dynamic range. Both objects near the vehicle and objects which are comparatively far away from the vehicle may be reliably identified. In particular, the radar cross section (RCS) values are correctly measured so that the RX channels are not saturated.

The radar circuit may be configured for at least one of a multiplex operation, a multiple input multiple output (MIMO) operation, or a frequency scan operation of the radar antenna assembly. Further, the radar circuit may be formed on a printed circuit board and/or the radar circuit may comprise a monolithic microwave integrated circuit (MMIC). The radar circuit may be arranged in a housing which is attached to the metallic component of the vehicle. The housing protects the radar circuit from dust, splash water, and the like.

According to an embodiment, the first radar antenna assembly comprises a feed horn and a reflector for the feed horn, and the second radar antenna assembly comprises an array of antenna elements, in particular a low gain array of antenna elements. The array of antenna elements may comprise dielectric antenna elements, substrate integrated waveguide (SIW)-based antenna elements, or patch antenna elements on a printed circuit board. The reflector-based radar antenna assembly has a rather high gain, whereas the radar antenna assembly without reflector has a relatively low gain.

In another aspect, the present disclosure is directed at a vehicle comprising a chassis, a body, and a radar system as disclosed herein, wherein the metallic component is a portion of the chassis or the body.

BRIEF DESCRIPTION OF THE DRAWINGS

Example embodiments and functions of the present disclosure are described herein in conjunction with the following drawings, showing schematically.

DETAILED DESCRIPTION

Figure 1:
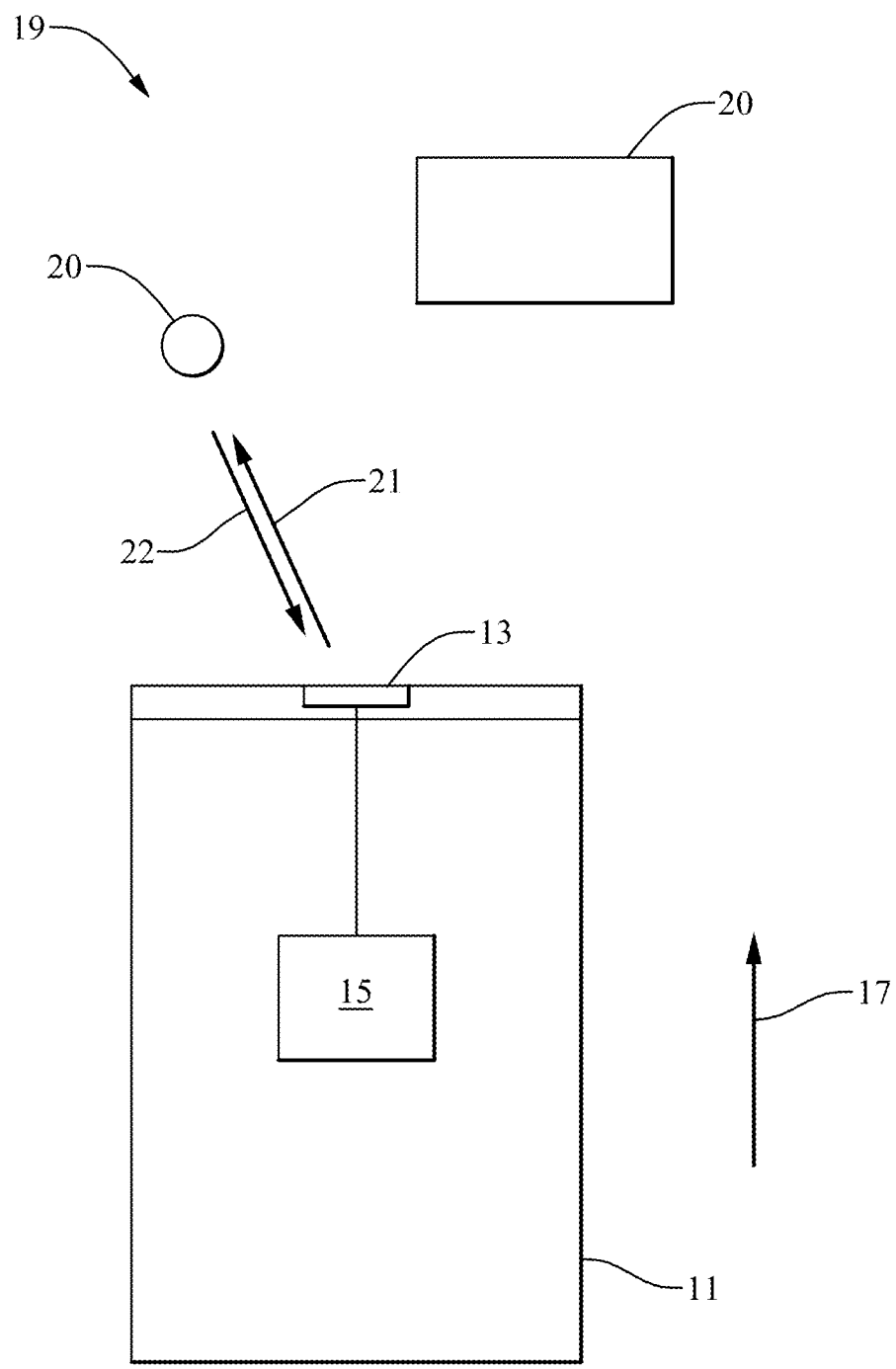
FIG. 1 is a motor vehicle equipped with a radar system.

FIG. 1 schematically depicts a motor vehicle 11, also called a host vehicle, and a radar system 13 mounted to a front portion of the motor vehicle 11. The radar system 13 is connected to an electronic processing device 15, for example an advanced driver assistance system or an autonomous driving system. In operation, the motor vehicle 11 is moving in a driving direction 17 in a traffic space 19, for example a road. Objects 20, such as other vehicles, pedestrians, or stationary obstacles, may be located in the traffic space 19.

The radar system 13 is configured for transmitting at least one primary radar signal 21 into the traffic space 19 and for detecting objects 20 present in the traffic space 19 on the basis of at least one secondary radar signal 22 reflected by the objects 20, as is generally known in the art.

Figure 2:
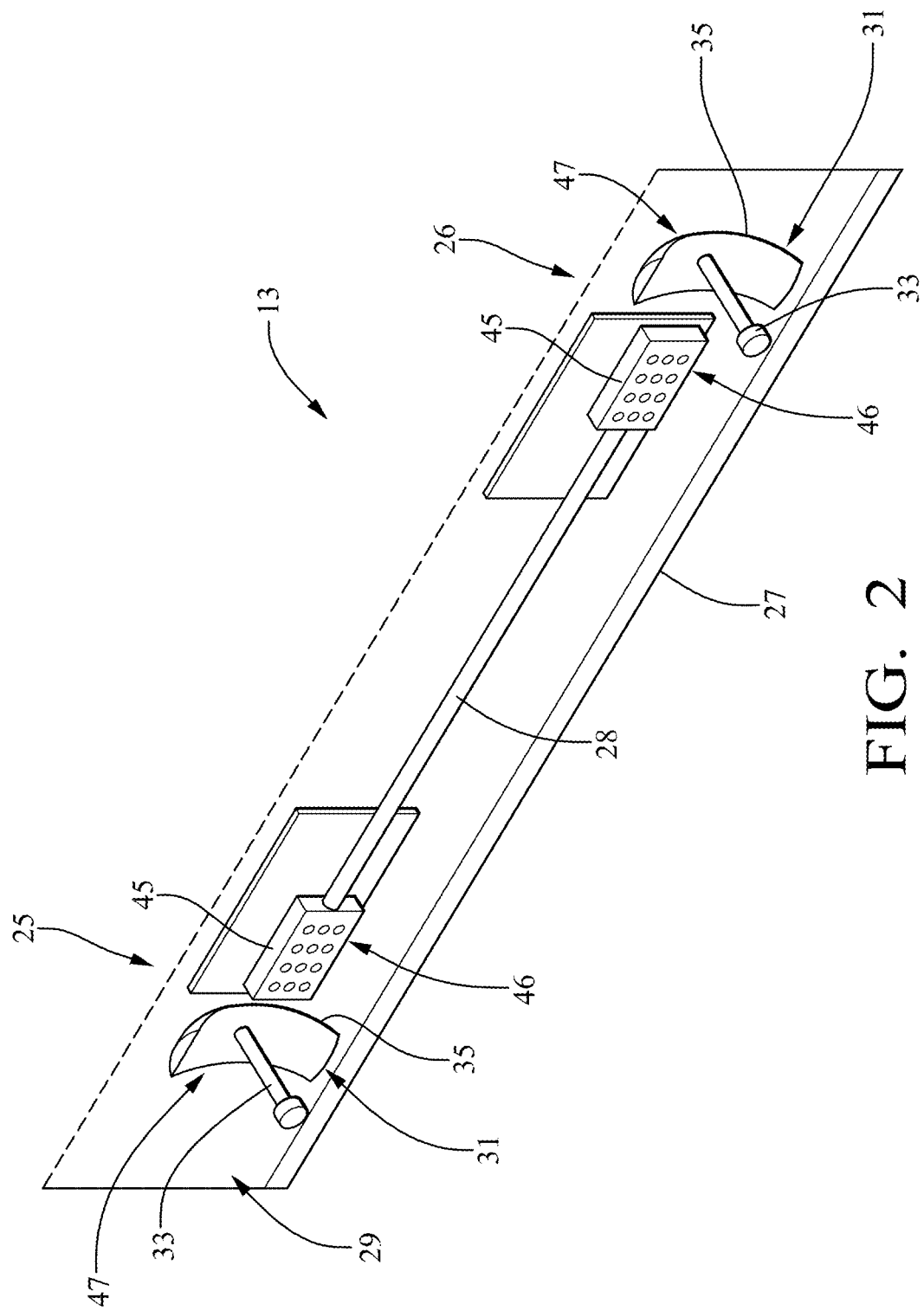
FIG. 2 is a radar system according to various embodiments in a perspective view.

According to various embodiments, as shown in FIG. 2, the radar system 13 comprises a first radar antenna assembly 25 and a second radar antenna assembly 26. The first radar antenna assembly 25 is spaced apart from the second radar antenna assembly 26 in a horizontal direction. The first radar antenna assembly 25 is connected to at least one radar transmitter, whereas the second radar antenna assembly 26 is connected to at least one radar receiver. To enable a bistatic radar operation of the radar system 13, a synchronization line 28 coupling the transmitter with the receiver is provided. The synchronization line 28 may operate, for example, at 20 GHz.

The radar system 13 is integrated in a crash beam 27 of the vehicle 11 (FIG. 1). The crash beam 27, which may be made from steel or another metal, is fixedly connected to a frame or a body of the vehicle 11. For example, the crash beam 27 may be configured as a hollow profile. Although the crash beam 27 appears to be depicted "horizontally" in FIG. 2 for visual clarity, the crash beam 27 may actually be adjacent to, or integrated with, the first and second radar antenna assemblies 25 and 26 as indicated by the dashed lines of FIG. 2 (e.g., the crash beam 27 can be physically positioned "vertically" with respect to the perspective shown in FIG. 2). A front surface 29 of the crash beam 27 comprises two curved surface portions 31 in the form of depressions.

Each of the first radar antenna assembly 25 and the second radar antenna assembly 26 comprises a feed horn 33 and a reflector 35—i.e., the radar antenna assemblies 25, 26 have high gain radar antenna units 47 of the reflector type. As shown in more detail in FIG. 3, each of the reflectors 35 is formed by a curved surface portion 31 of the crash beam 27. The curved surface portion 31 may be elliptically shaped to provide a fan beam. Instead of curved surface portions 31 as shown in FIG. 3, faceted portions of the crash beam 27 may form the reflectors 35.

Figure 3:
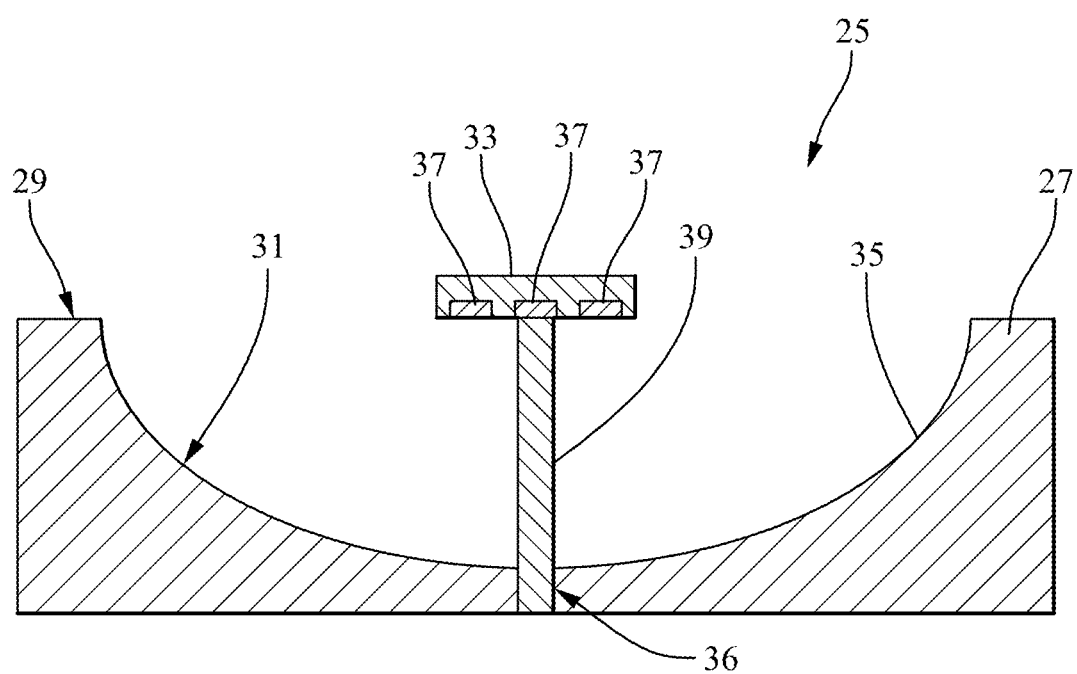
FIG. 3 is a radar antenna of the radar system according to FIG. 2.

In the embodiment shown in FIG. 3, the feed horn 33 enters the reflector 35 in a central region of the curved surface portion 31. As schematically shown in FIG. 3, the feed horn 33 comprises a plurality of antenna elements 37 pointing to the reflector 35. The antenna elements 37 may be configured as end portions of plastic waveguide members, not shown, which are received in a common conduit 39 and guided, via a passage 36 of the crash beam 27, through the curved surface portion 31. For some applications, a feed horn having a single antenna element 37 may be sufficient.

The waveguide members are connected to transmitters and/or receivers of a radar circuit (not shown) of the radar system 13. The radar circuit may be configured to generate and process radar signals, as is generally known. For example, the radar circuit may be configured as a monolithic microwave integrated circuit (MMIC). The radar circuit may be arranged in a cavity of the crash beam 27. Thus, only little installation space is required for the radar system 13.

The crash beam 27 may have recesses and insert members comprising the curved surface portions 31, wherein the insert members are insertable into the recesses. In other words, the reflectors 35 may be configured as insert members. A manufacturer of the radar system 13 may easily prefabricate modules comprising the reflectors 35 and deliver the modules to a manufacturer of the vehicle 11, who inserts the reflectors 35 into the recesses of the crash beam 27.

Referring back to FIG. 2, the first radar antenna assembly 25 and the second radar antenna assembly 26 comprise respective low gain radar antenna units 45, each of which has an array 46 of dielectric antenna elements. According to various embodiments, the radar circuit provides a first radar channel based on a transmission of radar signals via a high gain radar antenna unit 47 and on a reception of radar signals via a high gain radar antenna unit 47, a second radar channel based on a transmission of radar signals via a low gain radar antenna unit 45 and on a reception of radar signals via the low gain radar antenna unit 45, and a third radar channel based on a transmission of radar signals via a high gain radar antenna unit 47 and on a reception of radar signals via a low gain radar antenna unit 45 or on a transmission of radar signals via a low gain radar antenna unit 45 and on a reception of radar signals via a high gain radar antenna unit 47.

The synchronization line 28 may comprise a dielectric waveguide member. Alternatively, according to an embodiment not shown, the synchronization line may be configured as a waveguide member formed by the crash beam 27.

Instead of the curved surface portion 31 of the crash beam 27, a curved surface portion of another existing body or frame structure of the vehicle 11 may be used as a reflector 35. Thus, the curved surface portion 31 may be, for example, a portion of an A-pillar, a bumper, or a door of the vehicle.

EXAMPLE IMPLEMENTATIONS

Example 1: A radar system for a vehicle, the radar system comprising: a first radar antenna assembly connected to at least one radar transmitter for transmitting radar signals into a traffic space; and a second radar antenna assembly connected to at least one radar receiver for receiving radar signals reflected by objects present in the traffic space, wherein the first radar antenna assembly is spaced apart from the second radar antenna assembly, wherein the at least one radar transmitter is coupled to the at least one radar receiver by a synchronization line for a bistatic radar operation of the radar system, and wherein at least one of the first radar antenna assembly and the second radar antenna assembly comprises a feed horn and a reflector for the feed horn.

Example 2: The radar system of example 1, wherein the radar system comprises a metallic component of the vehicle and the reflector is formed by a curved or faceted surface portion of the metallic component of the vehicle.

Example 3: The radar system of example 2, wherein the metallic component has a recess and an insert member insertable into the recess, wherein the insert member comprises the curved or faceted surface portion.

Example 4: The radar system of at least any one of examples 1 to 3, wherein the reflector is elliptically shaped.

Example 5: The radar system of at least any one of examples 1 to 4, wherein the synchronization line comprises a dielectric waveguide member.

Example 6: The radar system of at least any one of examples 1 to 5, wherein the radar system comprises at least one radar circuit configured for an angle finding operation.

Example 7: A radar system for a vehicle, in particular the radar system of at least any one of examples 1 to 6, the radar system comprising: a first radar antenna assembly connected to at least one radar transmitter for transmitting radar signals into a traffic space; a second radar antenna assembly connected to at least one radar receiver for receiving radar signals reflected by objects present in the traffic space; and a metallic component of the vehicle, wherein the first radar antenna assembly is spaced apart from the second radar antenna assembly, wherein the at least one radar transmitter is coupled to the at least one radar receiver by a synchronization line for a bistatic radar operation of the radar system, and wherein the synchronization line is configured as a waveguide member formed by the metallic component of the vehicle.

Example 8: The radar system of example 7, wherein the metallic component forms at least a part of a crash beam of the vehicle.

Example 9: A radar system for a vehicle, in particular the radar system of at least any one of examples 1 to 8, the radar system comprising: a radar circuit for generating and processing radar signals; a first radar antenna unit for transmitting radar signals into a traffic space and for receiving radar signals reflected by objects present in the traffic space; and a second radar antenna unit for transmitting radar signals into a traffic space and for receiving radar signals reflected by objects present in the traffic space, wherein the first radar antenna unit and the second radar antenna unit have different antenna gains and wherein the radar circuit provides: a first radar channel based on a transmission of radar signals via the first radar antenna unit and on a reception of radar signals via the first radar antenna unit, a second radar channel based on a transmission of radar signals via the second radar antenna unit and on a reception of radar signals via the second radar antenna unit, and a third radar channel based on a transmission of radar signals via the first radar antenna unit and on a reception of radar signals via the second radar antenna unit or on a transmission of radar signals via the second radar antenna unit and on a reception of radar signals via the first radar antenna unit.

Example 10: The radar system of example 9, wherein the first radar antenna unit comprises a feed horn and a reflector for the feed horn, and wherein the second radar antenna unit comprises an array of antenna elements.

LIST OF REFERENCE CHARACTERS FOR THE
ITEMS IN THE DRAWINGS

The following is a list of certain items in the drawings, in numerical order. Items not included in the list may nonetheless be part of a given embodiment. For better legibility of the text, a given reference character may be recited near some, but not all, recitations of the referenced item in the text. The same reference number may be used with reference to different examples or different instances of a given item.

11 vehicle
13 radar system
15 electronic processing device
17 driving direction
19 traffic space
20 object
21 primary radar signal
22 secondary radar signal
25 first radar antenna assembly
26 second radar antenna assembly
27 crash beam
29 front surface
31 curved surface portion
33 feed horn
35 reflector
36 passage
37 antenna element
39 conduit
45 low gain radar antenna unit
46 array of dielectric antenna elements
47 high gain radar antenna unit

What is claimed is:

1. A radar system for a vehicle, the radar system comprising:
a first radar antenna assembly configured to be connected to at least one radar transmitter for transmitting radar signals into a traffic space; and
a second radar antenna assembly configured to be connected to at least one radar receiver for receiving radar signals reflected by objects present in the traffic space,
the first radar antenna assembly spaced apart from the second radar antenna assembly, the at least one radar transmitter coupled to the at least one radar receiver by a synchronization line for a bistatic radar operation of the radar system, and at least one of the first radar antenna assembly or the second radar antenna assembly comprising a feed horn and a reflector for the feed horn,
wherein the vehicle includes a metallic component defining a crash beam, and the synchronization line is configured as a waveguide member formed by the metallic component.

2. The radar system of claim 1, further comprising:
a metallic component of the vehicle,
wherein the reflector is formed by a curved or faceted surface portion of the metallic component of the vehicle.

3. The radar system of claim 2, wherein:
the metallic component includes a recess and an insert member insertable into the recess; and
the insert member comprises the curved or faceted surface portion of the metallic component.

4. The radar system of claim 1, wherein:
the reflector is elliptically shaped.

5. The radar system of claim 1, wherein:
the synchronization line comprises a dielectric waveguide member.

6. The radar system of claim 1, wherein:
the synchronization line comprises an air-filled metallic waveguide member.

7. The radar system of claim 1, further comprising:
at least one radar circuit configured to perform an angle finding operation.

8. The radar system of claim 1, wherein the first radar antenna assembly comprises:
a first radar antenna unit; and
a second radar antenna unit.

9. The radar system of claim 8, wherein:
the first radar antenna unit is configured to transmit radar signals into a traffic space and to receive radar signals reflected by objects present in the traffic space; and
the second radar antenna unit is configured to transmit radar signals into the traffic space and to receive radar signals reflected by objects present in the traffic space.

10. The radar system of claim 8, wherein:
the first radar antenna unit and the second radar antenna unit have different antenna gains.

11. The radar system of claim 10, wherein:
the first radar antenna unit has a relatively high gain; and
the second radar antenna unit has a relatively low gain.

12. The radar system of claim 8, wherein the second radar antenna assembly comprises:
a first radar antenna unit; and
a second radar antenna unit.

13. The radar system of claim 8, further comprising:
a radar circuit configured to generate and process radar signals, wherein:
the first radar antenna unit and the second radar antenna unit have different antenna gains; and
the radar circuit is configured to provide:
a first radar channel based on a transmission of radar signals via the first radar antenna unit and on a reception of radar signals via the first radar antenna unit,
a second radar channel based on a transmission of radar signals via the second radar antenna unit and on a reception of radar signals via the second radar antenna unit, and
a third radar channel based on a transmission of radar signals via the first radar antenna unit and on a reception of radar signals via the second radar antenna unit or on a transmission of radar signals via the second radar antenna unit and on a reception of radar signals via the first radar antenna unit.

14. A radar system for a vehicle, the radar system comprising:
a radar circuit configured to generate and process radar signals;
a first radar antenna unit configured to transmit radar signals into a traffic space and to receive radar signals reflected by objects present in the traffic space; and
a second radar antenna unit configured to transmit radar signals into the traffic space and to receive radar signals reflected by objects present in the traffic space,
the first radar antenna unit and the second radar antenna unit having different antenna gains, and
the radar circuit configured to provide:
a first radar channel based on a transmission of radar signals via the first radar antenna unit and on a reception of radar signals via the first radar antenna unit,
a second radar channel based on a transmission of radar signals via the second radar antenna unit and on a reception of radar signals via the second radar antenna unit, and a third radar channel based on a transmission of radar signals via the first radar antenna unit and on a reception of radar signals via the second radar antenna unit.

15. The radar system of claim 14, wherein:
the third radar channel is further based on a transmission of radar signals via the second radar antenna unit and on a reception of radar signals via the first radar antenna unit.

16. The radar system of claim 14, wherein:
the first radar antenna unit comprises a feed horn and a reflector for the feed horn; and
the second radar antenna unit comprises an array of antenna elements.

17. A vehicle comprising:
a chassis;
a body; and
a radar system comprising:
 a first radar antenna assembly configured to be connected to at least one radar transmitter for transmitting radar signals into a traffic space;
 a second radar antenna assembly configured to be connected to at least one radar receiver for receiving radar signals reflected by objects present in the traffic space; and
 a metallic component defining a crash beam of the vehicle, the metallic component including a curved or faceted surface portion,
 the first radar antenna assembly spaced apart from the second radar antenna assembly, the at least one radar transmitter coupled to the at least one radar receiver by a synchronization line for a bistatic radar operation of the radar system, at least one of the first radar antenna assembly or the second radar antenna assembly comprising a feed horn and a reflector for the feed horn, the reflector formed by the curved or faceted surface portion of the metallic component.

18. The vehicle of claim 17, wherein:
the metallic component comprises a metallic plate member including the curved or faceted surface portion, the metallic plate member inserted in a recess of the metallic component; and
the feed horn is fixed to the metallic plate member such that the curved or faceted surface portion forms the reflector for the feed horn.

* * * * *